US 9,798,434 B2

(12) United States Patent
Lee et al.

(10) Patent No.: US 9,798,434 B2
(45) Date of Patent: Oct. 24, 2017

(54) TOUCH PANEL AND DISPLAY APPARATUS HAVING THE SAME

(71) Applicant: SAMSUNG DISPLAY CO., LTD., Yongin-si, Gyeonggi-do (KR)

(72) Inventors: Jeongheon Lee, Seongnam-si (KR); Kangwon Lee, Seoul (KR); Byeongkyu Jeon, Busan (KR); Heewoong Park, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 7 days.

(21) Appl. No.: 14/945,307

(22) Filed: Nov. 18, 2015

(65) Prior Publication Data

US 2016/0209959 A1 Jul. 21, 2016

(30) Foreign Application Priority Data

Jan. 21, 2015 (KR) .................. 10-2015-0010229

(51) Int. Cl.
*G06F 3/041* (2006.01)
*G06F 3/044* (2006.01)

(52) U.S. Cl.
CPC ............ *G06F 3/044* (2013.01); *G06F 3/0412* (2013.01); *G06F 2203/04103* (2013.01)

(58) Field of Classification Search
CPC .......... G06F 3/041; G06F 3/045; G06F 3/042; G01R 27/26; G06K 11/06; G08C 21/00
See application file for complete search history.

(56) References Cited

U.S. PATENT DOCUMENTS

2010/0156840 A1 6/2010 Frey et al.
2011/0248953 A1* 10/2011 Lee .................... G06F 3/044
345/174

(Continued)

FOREIGN PATENT DOCUMENTS

JP 2013-101504 A 5/2013
JP 2013-131156 A 7/2013

(Continued)

OTHER PUBLICATIONS

Korean Patent Abstracts Publication No. 10-2014-0015905 A, dated Feb. 7, 2014, for KR 10-1363877 B1, 1 page.

(Continued)

*Primary Examiner* — Pegeman Karimi
(74) *Attorney, Agent, or Firm* — Lewis Roca Rothgerber Christie LLP

(57) ABSTRACT

A display apparatus includes a display panel configured to display an image, a window member on the display panel and including a display area for transmitting the image, and a non-display area adjacent the display area, and a touch panel between the display panel and the window member, the touch panel including a touch sensor corresponding to the display area and including a sensor part and a connection part and a signal line including a connection part coupled to and overlapping the connection part of the touch sensor, and a line part coupled to the connection part of the signal line, wherein the connection part of the touch sensor and the connection part of the signal line define a plurality of mesh holes.

22 Claims, 19 Drawing Sheets

(56) References Cited

U.S. PATENT DOCUMENTS

| | | | | |
|---|---|---|---|---|
| 2012/0068960 A1* | 3/2012 | Kim | ............... | H05K 1/0216 |
| | | | | 345/174 |
| 2012/0139871 A1* | 6/2012 | Ku | ............ | G06F 3/044 |
| | | | | 345/174 |
| 2012/0188199 A1* | 7/2012 | Sekiguchi | ............ | G06F 3/044 |
| | | | | 345/174 |
| 2013/0224370 A1* | 8/2013 | Cok | ............ | C23C 18/06 |
| | | | | 427/108 |
| 2013/0265256 A1* | 10/2013 | Nathan | ............ | G06F 3/0414 |
| | | | | 345/173 |
| 2015/0084887 A1* | 3/2015 | Kuo | ............ | G06F 1/1643 |
| | | | | 345/173 |
| 2015/0101919 A1* | 4/2015 | Bae | ............ | G06F 3/044 |
| | | | | 200/5 R |
| 2016/0043348 A1* | 2/2016 | Zhang | ............ | H01L 51/5256 |
| | | | | 257/40 |

FOREIGN PATENT DOCUMENTS

| | | |
|---|---|---|
| JP | 2013-218010 A | 10/2013 |
| KR | 10-1325654 B1 | 11/2013 |
| KR | 10-1363877 B1 | 2/2014 |
| KR | 10-1405697 B1 | 6/2014 |

OTHER PUBLICATIONS

Korean Patent Abstracts Publication No. 10-2014-0017009 A, dated Feb. 10, 2014, for KR 10-1405697 B1, 1 page.

* cited by examiner

FIG. 9A
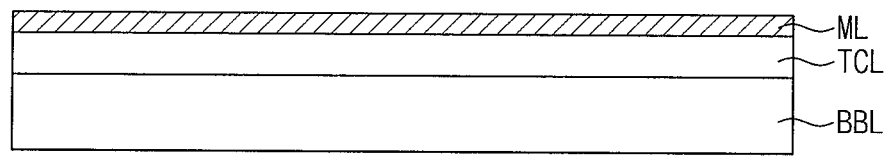
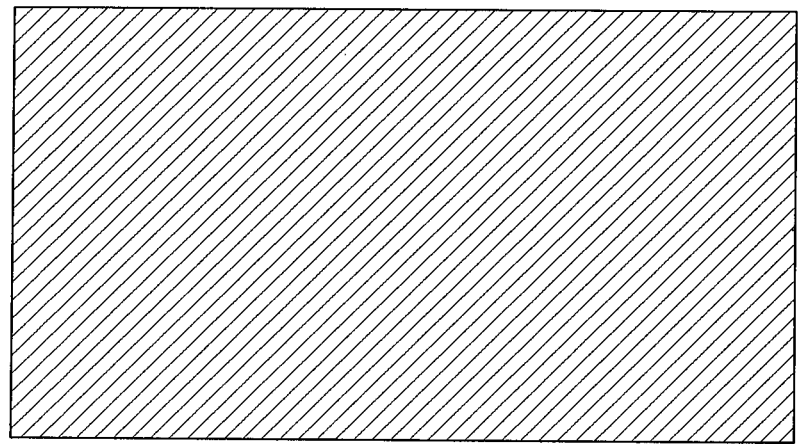
FIG. 9B

FIG. 10A
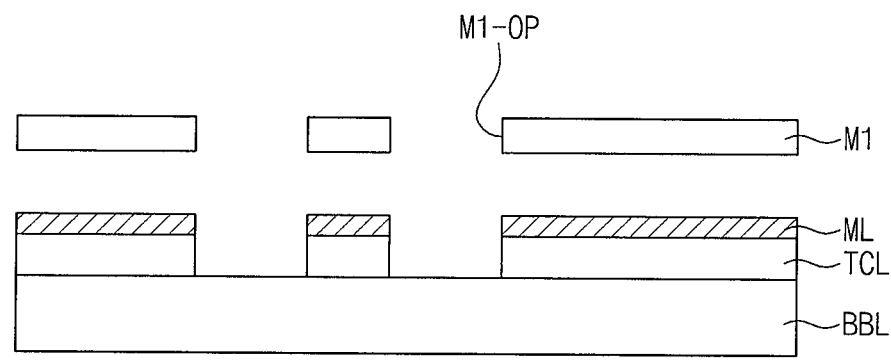
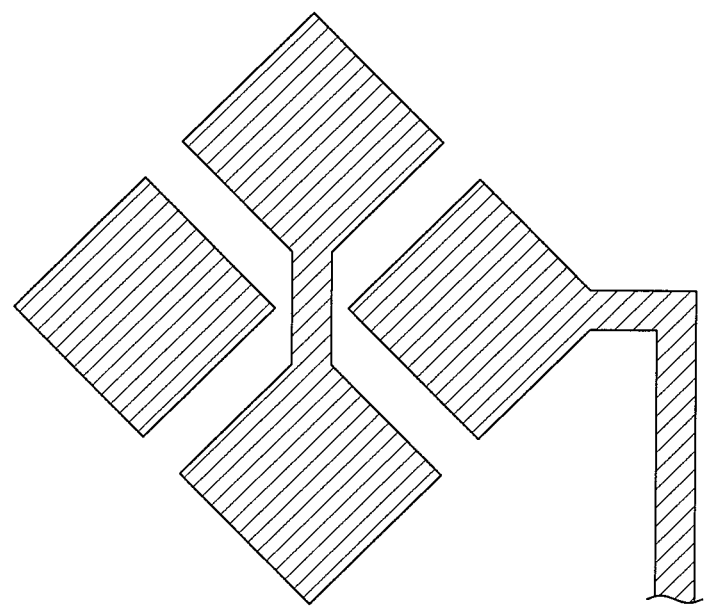
FIG. 10 B

FIG. 11A
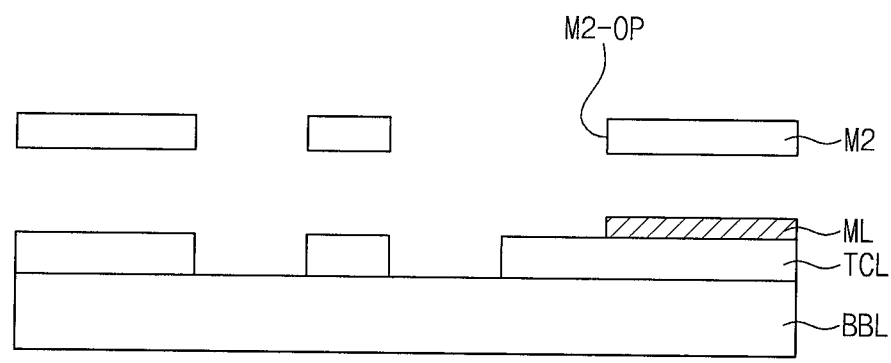
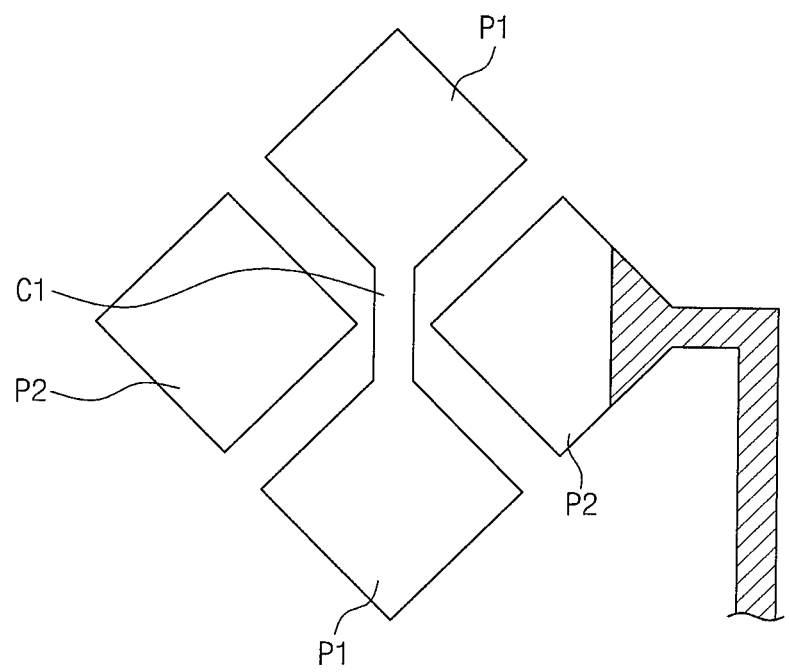
FIG. 11B

FIG. 12A
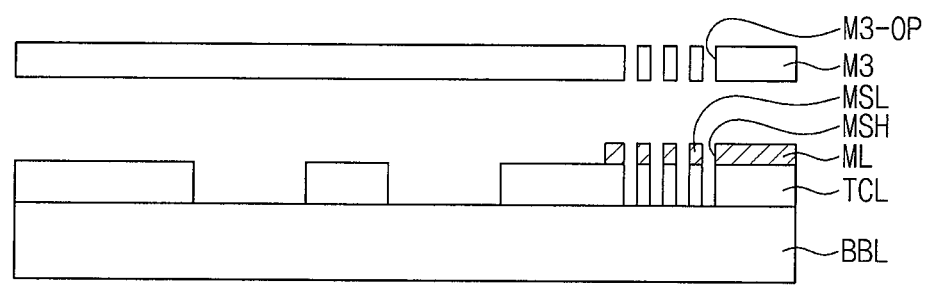
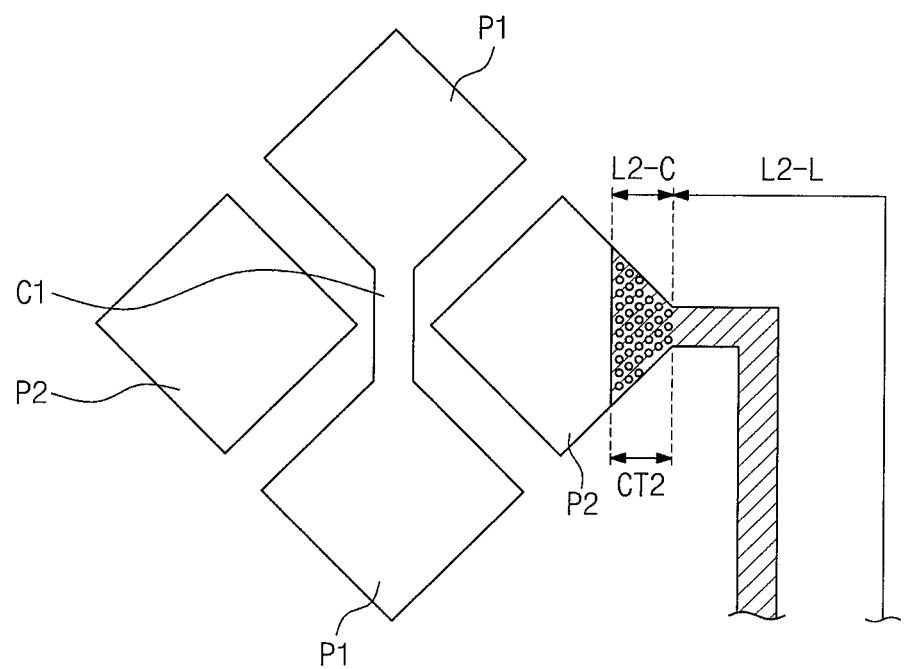
FIG. 12B

FIG. 13A
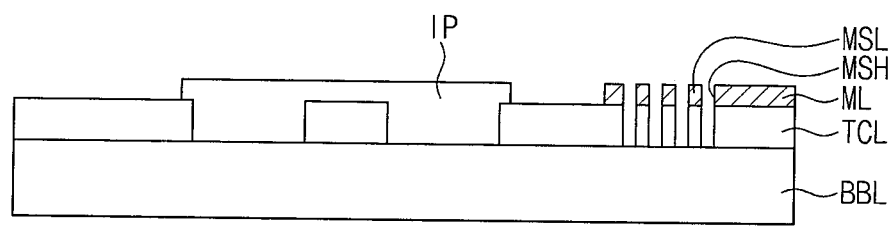
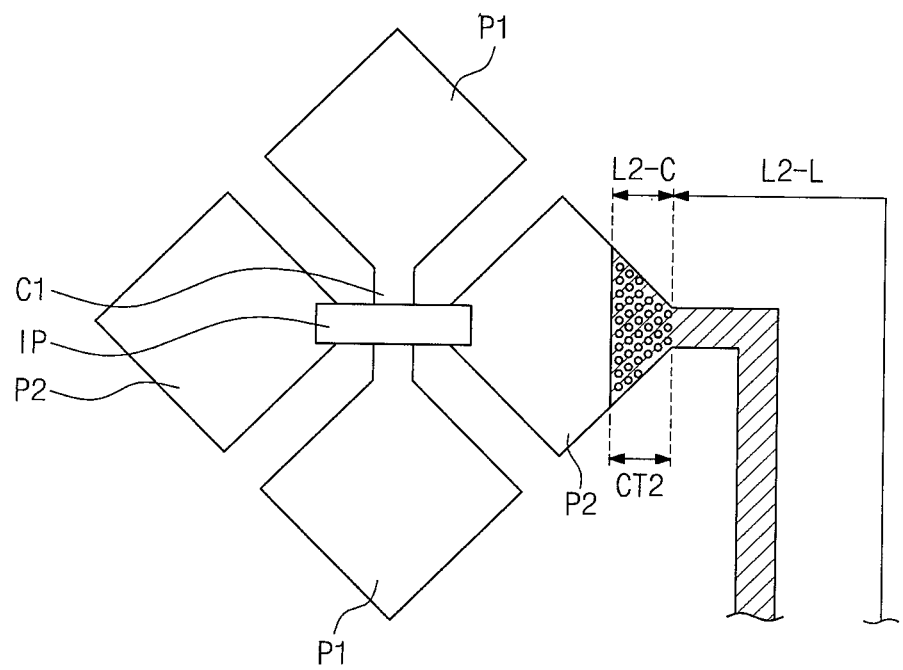
FIG. 13B

FIG. 14A
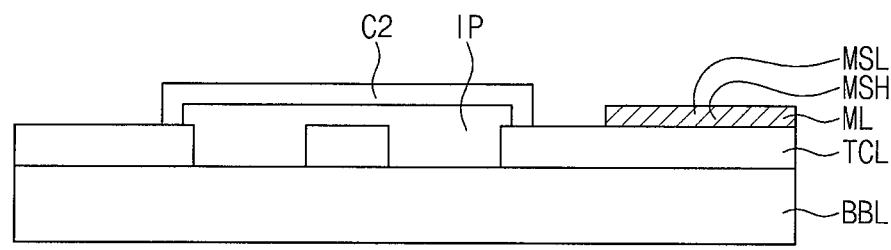
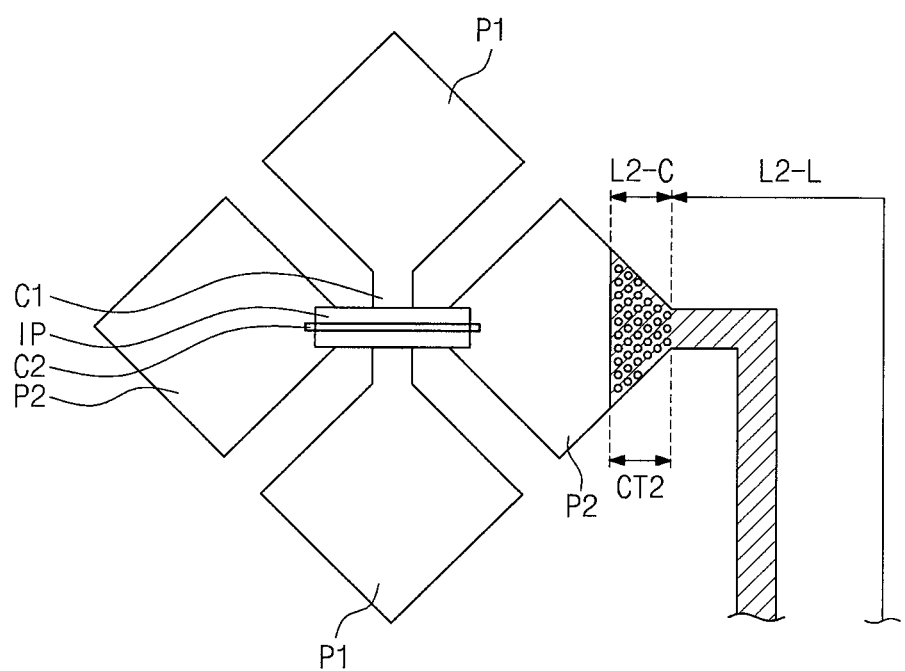
FIG. 14B

TOUCH PANEL AND DISPLAY APPARATUS HAVING THE SAME

CROSS-REFERENCE TO RELATED APPLICATION

This patent application claims priority to and the benefit of Korean Patent Application No. 10-2015-0010229, filed on Jan. 21, 2015, the contents of which are hereby incorporated by reference in their entirety.

BACKGROUND

1. Field

The present disclosure relates to a touch panel and a display apparatus having the same. More particularly, the present disclosure relates to a touch panel having a reduced non-display area, and a display apparatus having the touch panel.

2. Description of the Related Art

In recent years, various display devices, which are employed in multimedia devices, such as a television set, a mobile phone, a tablet computer, a navigation unit, a game unit, etc., have been actively developed. A keyboard and/or a mouse is widely used as an input device for the display devices. In addition, the display devices include a touch panel as an input device.

SUMMARY

The present disclosure provides a touch panel capable of preventing a connection part of a signal line from being perceived, and also provides a display apparatus having the touch panel.

Embodiments of the inventive concept provide a display apparatus including a display panel configured to display an image, a window member on the display panel and including a display area for transmitting the image, and a non-display area adjacent the display area, and a touch panel between the display panel and the window member, the touch panel including a touch sensor corresponding to the display area and including a sensor part and a connection part and a signal line including a connection part coupled to and overlapping the connection part of the touch sensor, and a line part coupled to the connection part of the signal line, wherein the connection part of the touch sensor and the connection part of the signal line define a plurality of mesh holes.

The connection part of the touch sensor may include a transparent conductive layer, and the connection part of the signal line may include a metal layer.

The line part of the signal line may include a transparent conductive layer integrally formed with the transparent conductive layer of the connection part of the touch sensor and a metal layer integrally formed with the metal layer of the connection part of the signal line.

The metal layer of the connection part of the signal line may be on the transparent conductive layer of the connection part of the touch sensor.

The connection part of the signal line may have substantially a same shape as the connection part of the touch sensor in the display area.

The line part of the signal line may correspond to the non-display area.

The window member may include a base member, and a black matrix at a surface of the base member and overlapping the non-display area.

The display panel may include a base member, a circuit layer on the base member, an organic light emitting device layer on the circuit layer, and an encapsulation layer for sealing the organic light emitting device layer.

The touch sensor and the signal line may be directly on the encapsulation layer.

The encapsulation layer may include inorganic thin film layers and organic thin film layers.

The touch panel may further include a touch panel base member on the encapsulation layer, and the touch sensor and the signal line may be on the touch panel base member.

The touch sensor may include first touch sensors on a base layer, and second touch sensors on the base layer and insulated from the first touch sensors while crossing the first touch sensors.

Each of the first touch sensors may include a first sensor part, which includes first sensor patterns arranged in a first direction, and first connection patterns respectively connecting adjacent ones of the first sensor patterns and a first connection part, and each of the second touch sensors may include a second sensor part, which includes second sensor patterns arranged in a second direction crossing the first direction, and second connection patterns respectively connecting adjacent ones of the second sensor patterns and a second connection part.

The touch sensor further may include insulating patterns on the first connection patterns and spaced apart from each other, and the second connection patterns may be on the insulating patterns.

The first sensor patterns and the first connection patterns may be integrally formed, the second sensor patterns and the second connection patterns may be integrally formed, and the first touch sensors may be on a different layer than the second touch sensors.

Embodiments of the inventive concept provide a touch panel including a touch sensor including a transparent conductive layer, and a signal line coupled to the touch sensor and including a connection part, and a line part, wherein the connection part includes a transparent conductive layer integrally formed with the transparent conductive layer of the touch sensor, and a metal layer overlapping the transparent conductive layer of the connection part, wherein the transparent conductive layer of the connection part and the metal layer of the connection part define a plurality of mesh holes.

The line part may include a transparent conductive layer integrally formed with the transparent conductive layer of the connection part, and a metal layer integrally formed with the metal layer of the connection part.

The metal layer of the connection part may be on the transparent conductive layer of the connection part.

The metal layer of the connection part may include molybdenum, silver, titanium, copper, aluminum, or an alloy thereof.

The transparent conductive layer of the connection part may include indium tin oxide, indium zinc oxide, zinc oxide, indium tin zinc oxide, PEDOT, metal nanowire, or graphene.

According to the above, the connection part of the signal line has the mesh shape. When the mesh holes are formed through the connection part of the signal line, the connection part of the signal line is not perceived by a user, even though the signal line includes the metal layer. Therefore, the non-display area of the display apparatus is reduced.

In addition, because the connection part of the signal line has the mesh shape, the signal line has substantially a constant resistance regardless of an area thereof. Accordingly, static electricity may be prevented from occurring at a boundary in which the resistance is otherwise extremely varied. In other words, although the static electricity is applied to the touch panel, the boundary is not opened between the connection part of the signal line and the line part of the signal line.

The connection part of the touch sensor has the mesh shape defined by the mesh holes. Although the static electricity is applied to the touch panel, the boundary is not opened between the sensor part of the touch sensor and the connection part of the touch sensor. In addition, although the static electricity is applied to the touch panel, the boundary is not opened between the connection part of the touch sensor and the connection part of the signal line.

BRIEF DESCRIPTION OF THE DRAWINGS

The above and other aspects of the present disclosure will become readily apparent by reference to the following detailed description when considered in conjunction with the accompanying drawings wherein:

FIGS. 9A, 9B, 10A, 10B, 11A, 11B, 12A, 12B, 13A, 13B, 14A, and 14B are views showing a manufacturing method of the touch panel shown in FIG. 5;

DETAILED DESCRIPTION

Figure 1:
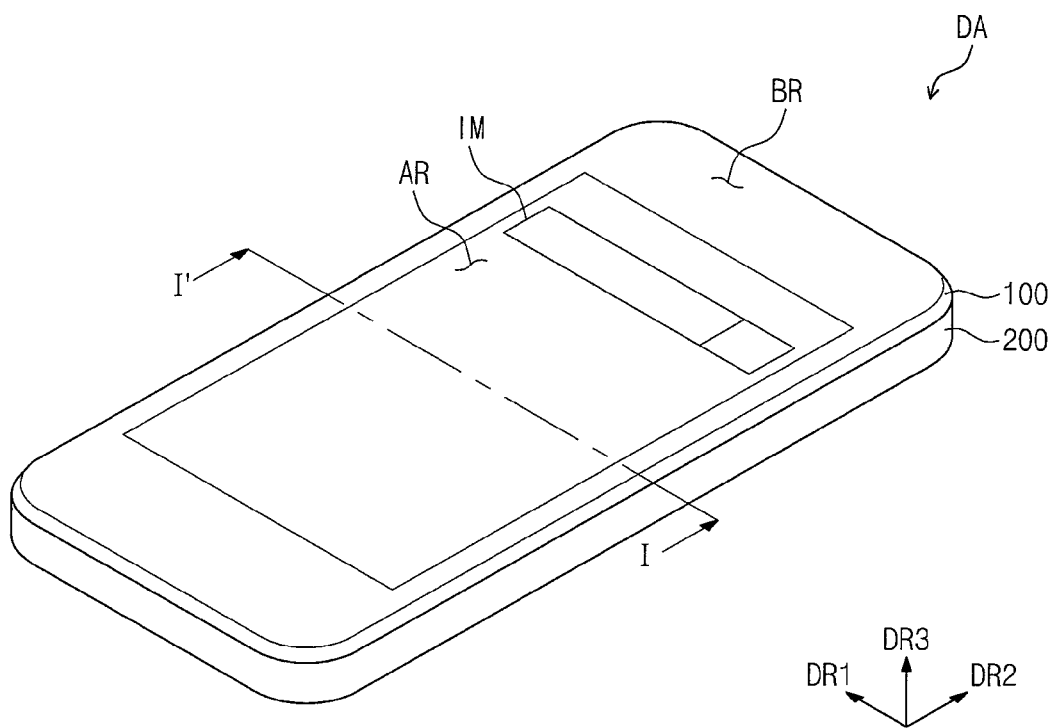
FIG. 1 is a perspective view showing a display apparatus according to an exemplary embodiment of the present disclosure.

Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present invention. As used herein, the singular forms "a," "an," and "the" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2:
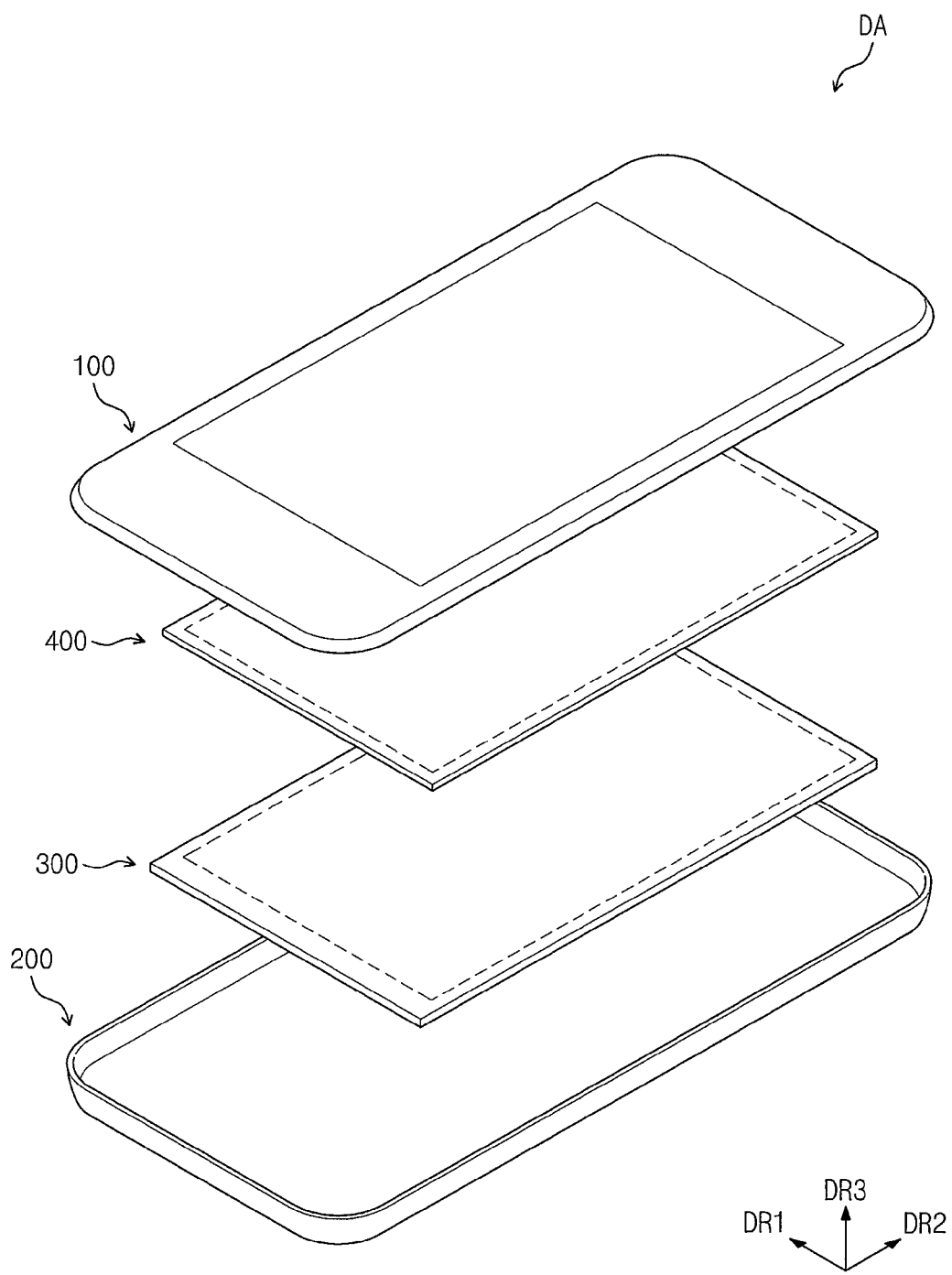
FIG. 2 is an exploded perspective view showing a display apparatus according to an exemplary embodiment of the present disclosure.
Figure 3:
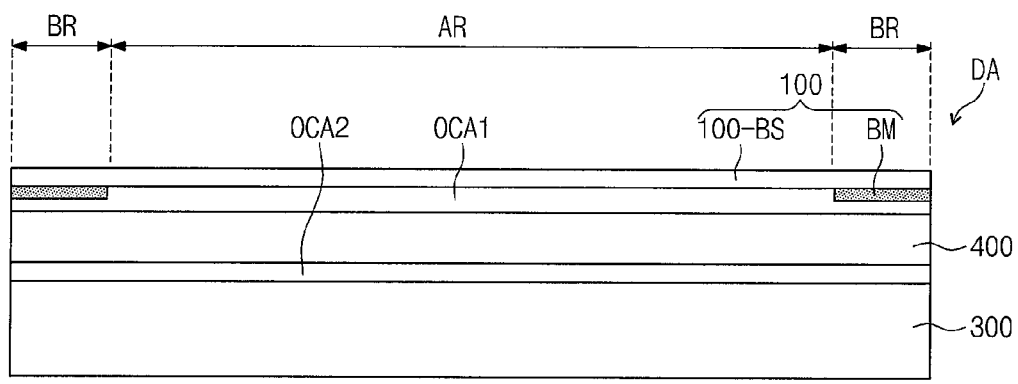
FIG. 3 is a cross-sectional view taken along the line I-I' of FIG. 1 to show the display apparatus.

FIG. 1 is a perspective view showing a display apparatus DA according to an exemplary embodiment of the present disclosure, FIG. 2 is an exploded perspective view showing the display apparatus DA according to an exemplary embodiment of the present disclosure, and FIG. 3 is a cross-sectional view taken along the line I-I' of FIG. 1 to show the display apparatus DA. FIG. 3 does not show a protective frame 200.

In the present exemplary embodiment, a display surface on which an image IM is displayed is substantially parallel to a surface/plane defined by a first direction DR1 and a second direction DR2. A third direction DR3 indicates a direction that is normal to, or in a normal line direction of, the display surface. The third direction DR3 indicates a thickness direction of the display apparatus DA. Front and rear surfaces of each member of the display apparatus DA are distinct from each other by the third direction DR3. However, directions indicated by the first, second, and third directions DR1, DR2, and DR3 are relative.

FIG. 1 shows a flat display apparatus DA as a representative example, but the display apparatus according to the present disclosure should not be limited to the flat display apparatus DA. That is, the display apparatus according to the present disclosure may be a curved display apparatus, a rollable display apparatus that can be rolled, or a foldable display apparatus that can be folded. Although not shown in figures, the display apparatus DA may be applied to a large-sized electronic item, such as a television set, an outdoor billboard, etc., and may also be applied to a small to medium-sized electronic item, such as a personal computer, a notebook computer, a personal digital assistant, a navigation unit, a game unit, a mobile electronic device, a wrist-type electronic device, a camera, etc., but it should not be limited thereto or thereby.

Referring to FIG. 1, the display apparatus DA includes a plurality of areas distinct from each other on the display surface. The display apparatus DA includes a display area AR in which the image IM is displayed, and a non-display area BR located adjacent the display area AR. FIG. 1 shows an internet search window as a representative example of the image IM. The display area AR may be, but is not limited to, a quadrangular shape. The non-display area BR surrounds the display area AR.

Referring to FIGS. 2 and 3, the display apparatus DA includes a window member 100, the protective frame 200, a display panel 300, and a touch panel 400. Each of the window member 100, the display panel 300, and the touch panel 400 includes areas corresponding to the display area AR and the non-display area BR of the display apparatus DA, when viewed in a plan view.

The window member 100 includes a base member 100-BS and a black matrix BM. The black matrix BM is located on a rear surface of the base member 100-BS to define the non-display area BR. The base member 100-BS may include, for example, a glass substrate, a sapphire substrate, or a plastic film. The black matrix BM is formed by a coating process using a colored organic layer. Although not shown in figures, the window member 100 may further include a functional coating layer located on a front surface of the base member 100-BS. The functional coating layer may include an anti-fingerprint layer, an anti-glare layer, and/or a hard coating layer.

The protective frame 200 is coupled to the window member 100 to accommodate the display panel 300 and the touch panel 400. The protective frame 200 is formed by assembling multiple parts, or is integrally formed as a single unitary and individual unit, which may be formed by an injection molding method. The protective frame 200 may include a plastic or metal material. In the present exemplary embodiment, the protective frame 200 may be omitted.

The display panel 300 generates the image IM corresponding to image data applied thereto. The display panel 300 may be, for example, a liquid crystal display panel or an organic light emitting display panel. In the present exemplary embodiment, the display panel 300 will be described as an organic light emitting display panel.

The touch panel 400 is configured to obtain coordinate information of a position at which a touch event occurs. The touch panel 400 may be, for example, a resistive film type touch panel, an electrostatic capacitive type touch panel, or an electromagnetic induction type touch panel. The touch panel 400 will be described in greater detail later.

The window member 100 and the touch panel 400 are coupled to each other by an optically clear adhesive film OCA1, and the touch panel 400 and the display panel 300 are coupled to each other by an optically clear adhesive film OCA2. Either or both of the two optically clear adhesive films OCA1 and OCA2 may be omitted. For instance, when the display panel 300 and the touch panel 400 are manufactured through consecutive processes, the touch panel 400 may be located directly on the display panel 300.

Figure 4:
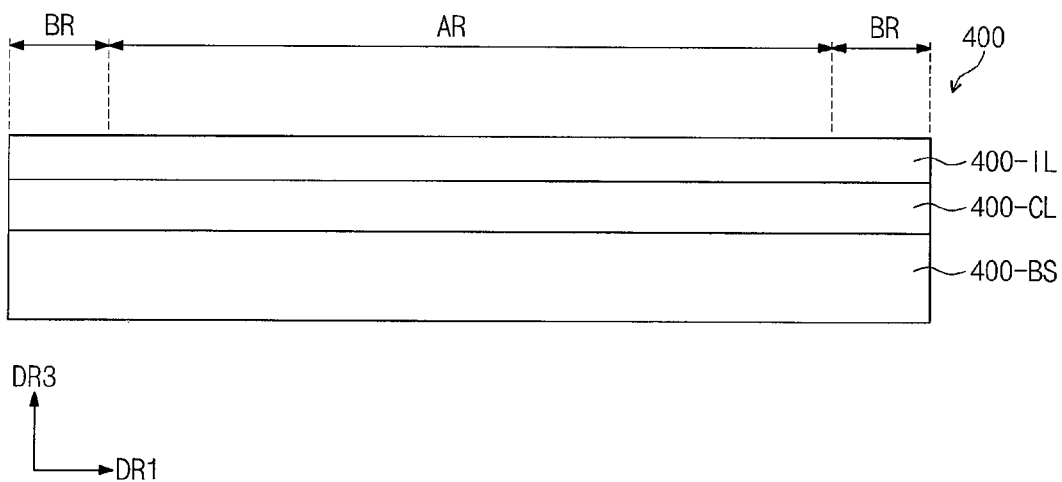
FIG. 4 is an enlarged cross-sectional view showing a touch panel shown in FIG. 3.
Figure 5:
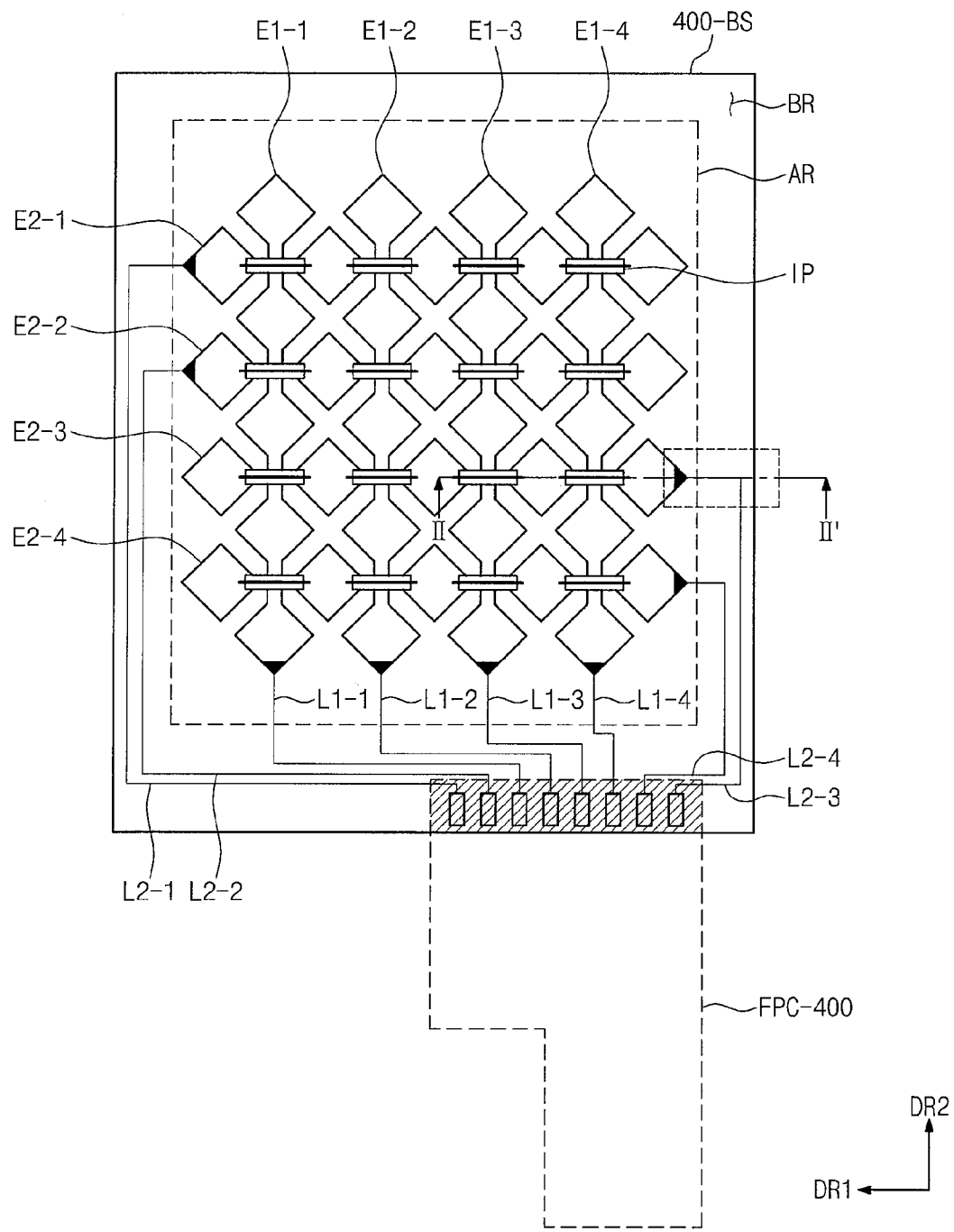
FIG. 5 is a plan view showing the touch panel shown in FIG. 3.
Figure 6A:
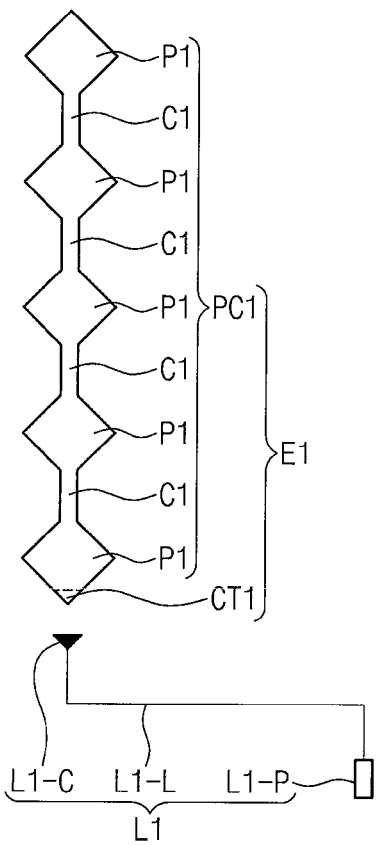
FIGS. 6A and 6B are plan views showing portions of the touch panel shown in FIG. 3.
Figure 6B:
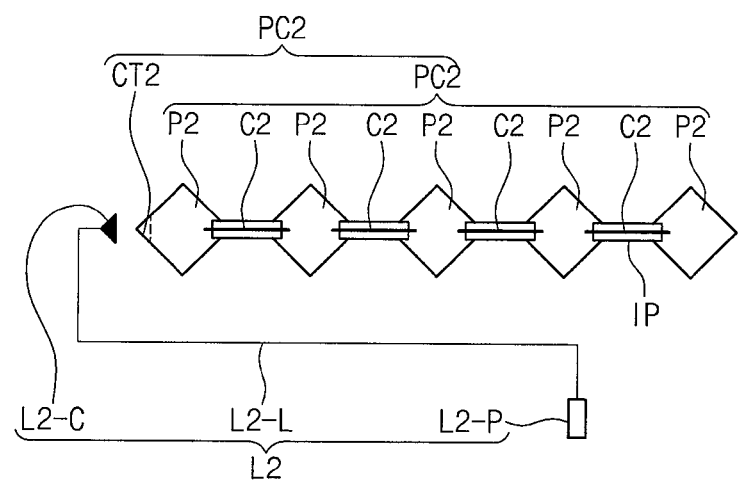

FIG. 4 is an enlarged cross-sectional view showing the touch panel shown in FIG. 3, FIG. 5 is a plan view showing the touch panel shown in FIG. 3, and FIGS. 6A and 6B are plan views showing portions of the touch panel shown in FIG. 3. Hereinafter, the touch panel 400 will be described in detail with reference to FIGS. 4, 5, 6A, and 6B.

Referring to FIG. 4, the touch panel 400 includes a base member 400-BS, a conductive layer 400-CL, and an insulating layer 400-IL. In the present exemplary embodiment, a single-layer electrostatic capacitive type touch panel will be described as a representative example. The single-layer electrostatic capacitive type touch panel obtains the coordinate information about the position of the touch event using a self-capacitance method or using a mutual capacitance method. The touch panel 400 may be replaced with the resistive film type touch panel or with the electromagnetic induction type touch panel, and in this case, the structure of the conductive layer 400-CL will be changed.

The conductive layer 400-CL includes at least one transparent conductive layer and at least one metal layer, which are stacked in the third direction DR3. The transparent conductive layer may include indium tin oxide (ITO), indium zinc oxide (IZO), zinc oxide (ZnO), indium tin zinc oxide (ITZO), PEDOT, metal nanowire, or graphene. The metal layer may include molybdenum, silver, titanium, copper, aluminum, or an alloy thereof.

The conductive layer 400-CL includes a plurality of patterns located on a surface of the base member 400-BS. The patterns form touch sensors and signal lines of the touch panel 400. The insulating layer 400-IL protects the patterns or insulates a portion of the patterns from the other portion of the patterns.

Referring to FIG. 5, the touch sensors include first touch sensors E1-1 to E1-4 (hereinafter, assigned with a reference numeral E1) and second touch sensors E2-1 to E2-4 (hereinafter, assigned with a reference numeral E2). The first touch sensors E1 extend in the second direction DR2, and are arranged in the first direction DR1. The second touch sensors E2 are insulated from the first touch sensors E1 while crossing the first touch sensors E1. FIG. 5 shows four first touch sensors E1 and four second touch sensors E2. The first and second touch sensors E1 and E2 are located to overlap the display area AR.

The signal lines include first signal lines L1-1 to L1-4 (hereinafter, assigned with a reference numeral L1) and second signal lines L2-1 to L2-4 (hereinafter, assigned with a reference numeral L2). The first signal lines L1 are connected to one end of respective first touch sensors E1, and the second signal lines L2 are connected to one end of respective second touch sensors E2. The first and second signal lines L1 and L2 are located to overlap/be in the non-display area BR.

The insulating layer 400-IL includes insulating patterns IP spaced apart from each other. The insulating patterns IP partially overlap the first and second touch sensors E1 and E2 (e.g., at crossing regions of respective ones of the first and second touch sensors E1 and E2). In the present exemplary embodiment, the insulating layer 400-IL is located on entire surface of the display area AR. In this case, the insulating layer 400-IL includes a plurality of thru-holes formed therethrough. The thru-holes serve as paths through which second connection patterns are connected to two second sensor patterns, which are described later.

FIG. 6A shows one first touch sensor E1 and one first signal line L1. The first touch sensor E1 includes a first sensor part PC1 and a first connection part CT1. The first sensor part PC1 includes first sensor patterns P1 arranged in the second direction DR2, and first connection patterns C1 for connecting two adjacent first sensor patterns P1. The first sensor patterns P1 and the first connection patterns C1 may be integrally formed as a single unitary and individual unit. In addition, the first sensor part PC1 and the first connection part CT1 may be integrally formed as a single unitary and individual unit. This is because the first sensor part PC1 and the first connection part CT1 may be formed through the same process.

The first signal line L1 includes a first connection part L1-C (e.g., another first connection part L1-C), a first line part L1-L, and a first pad part L1-P, although first pad part L1-P may be omitted. The first connection part L1-C of the first signal line L1 is overlapped with the first connection part CT1 of the first touch sensor E1.

FIG. 6B shows one second touch sensor E2 and one second signal line L2. The second touch sensor E2 includes a second sensor part PC2 and a second connection part CT2. The second sensor part PC2 includes second sensor patterns P2 arranged in the first direction DR1, and second connection patterns C2 connecting two adjacent second sensor patterns P2.

The second sensor patterns P2 and the second connection part CT2 may be integrally formed as a single unitary and individual unit. The second connection patterns C2 are located to overlap the insulating patterns IP. The second connection patterns C2 may be bridge electrodes located on the insulating patterns IP. The second sensor patterns P2 include a material different from that of the second connection patterns C2. The material of the second connection patterns C2 has a resistance that is lower than that of the second sensor patterns P2. In the present exemplary embodiment, the second sensor part PC2 and the second connection part CT2 may be integrally formed as a single unitary and individual unit.

The second signal line L2 includes a second connection part L2-C (e.g., another second connection part L2-C), a second line part L2-L, and a second pad part L2-P, although the second pad part L2-P may be omitted. The second connection part L2-C of the second signal line L2 overlaps the second connection part CT2 of the second touch sensor E2.

Referring to FIG. 5 again, the first pad parts L1-P of the first signal lines L1, and the second pad parts L2-P of the second signal lines L2, are aligned at one side of the non-display area BR. The first and second pad parts L1-P and L2-P are connected to a first flexible circuit board FPC-400. The touch panel 400 is connected to a main driving circuit through the first flexible circuit board FPC-400.

Figure 7:
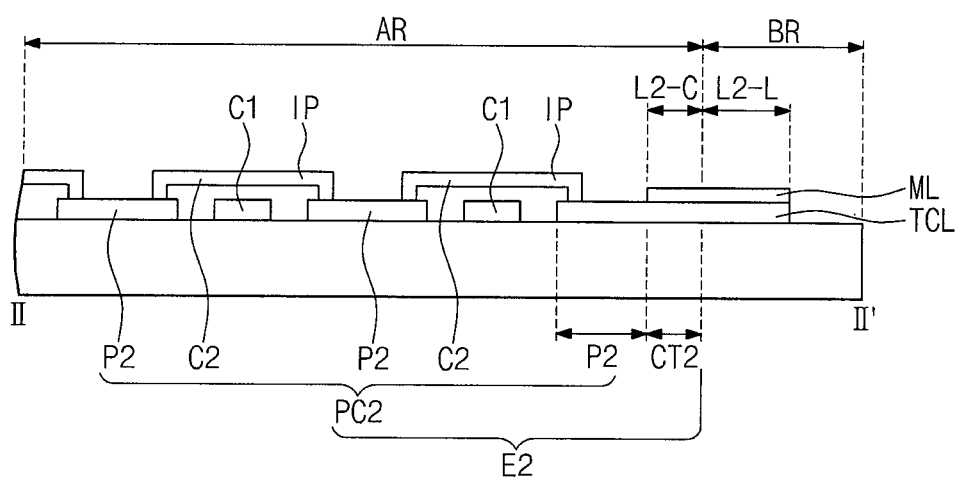
FIG. 7 is a cross-sectional view taken along the line II-II' of FIG. 5.
Figure 8A:
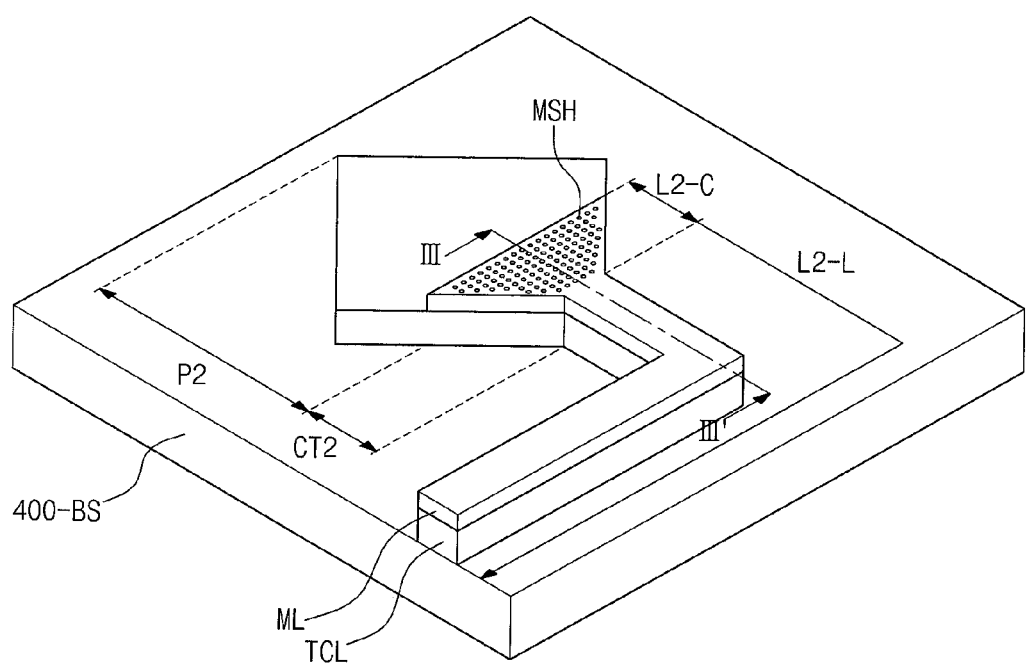
FIG. 8A is an enlarged perspective view showing the portion AA shown in FIG. 5.
Figure 8B:
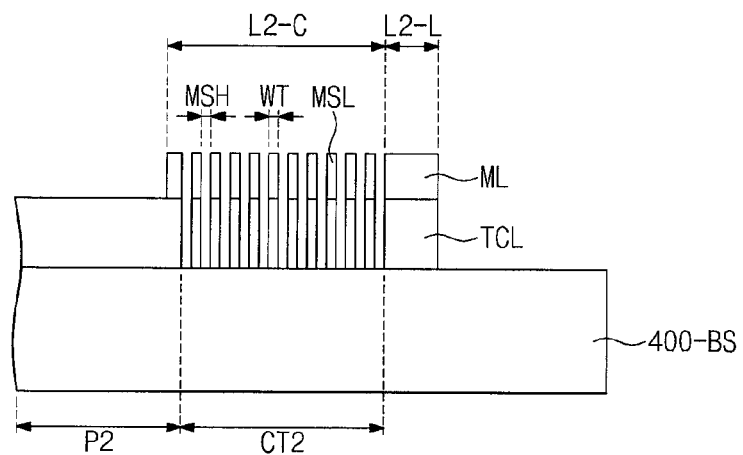
FIG. 8B is a cross-sectional view taken along the line III-III' of FIG. 8A.
Figures 8C, 8D:
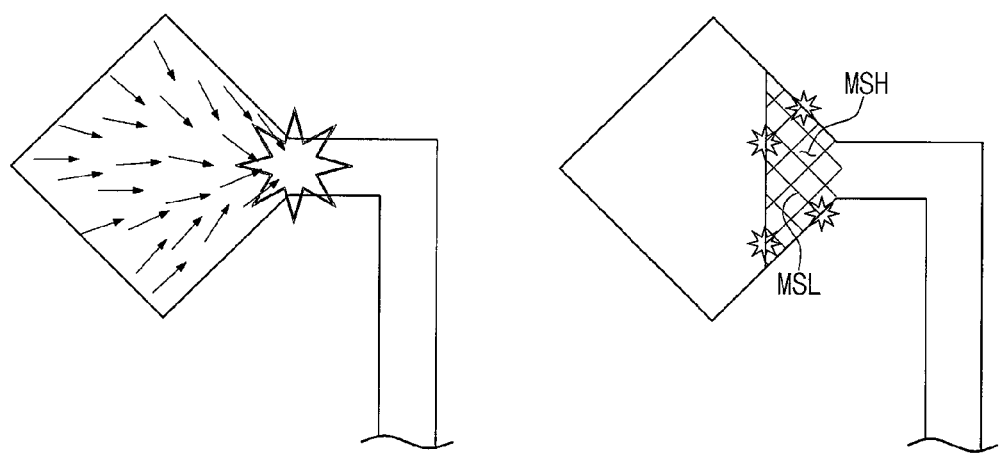
FIG. 8C is a view showing a flow of static electricity applied to a conventional touch panel.
FIG. 8D is a view showing a flow of static electricity applied to the touch panel shown in FIG. 8A.

FIG. 7 is a cross-sectional view taken along the line II-II' of FIG. 5, FIG. 8A is an enlarged perspective view showing the portion AA shown in FIG. 5, FIG. 8B is a cross-sectional view taken along the line III-III' of FIG. 8A, FIG. 8C is a view showing a flow of static electricity applied to a conventional touch panel, and FIG. 8D is a view showing a flow of static electricity applied to the touch panel shown in FIG. 8A. Hereinafter, the structure of the second signal line L2, and the connection relation between the second touch sensor E2 and the second signal line L2, will be described in detail with reference to FIGS. 7 and 8A to 8C. Although not shown in figures, the structure of the first signal line L1 may be substantially the same as that of the second signal line L2, and the connection relation between the first touch sensor E1 and the first signal line L1 may be substantially the same as the connection relation between the second touch sensor E2 and the second signal line L2.

Referring to FIG. 7, the second touch sensor E2 includes the second sensor part PC2 and the second connection part CT2. The second sensor part PC2 includes the second sensor patterns P2 and the second connection patterns C2. The second sensor patterns P2 include a transparent conductive layer TCL. The second connection patterns C2 includes a metal layer. The second connection part CT2 includes the transparent conductive layer TCL. The second sensor patterns P2 and the second connection part CT2 may be integrally formed as a single unitary and individual unit.

The second connection part L2-C of the second signal line L2 located on the second connection part CT2 of the second touch sensor E2 includes the metal layer. The second line part L2-L of the second signal line L2 includes the transparent conductive layer TCL and the metal layer ML, which are stacked. The second connection part L2-C of the second signal line L2, and the metal layer ML of the second connection part L2-L, may be integrally formed as a single unitary and individual unit.

In the present exemplary embodiment, the second touch sensor E2 may be defined by only the second sensor part PC2. The second connection part CT2 corresponds to a portion of the second signal line L2. For instance, the second connection part L2-C of the second signal line L2 may be defined to include the transparent conductive layer TCL and the metal layer ML, which are stacked together. In this case, the second line part L2-L of the second signal line L2 includes the transparent conductive layer TCL and the metal layer ML, which are stacked together. The transparent conductive layer TCL of the second connection part L2-C and the transparent conductive layer TCL of the second line part L2-L may be integrally formed as a single unitary and individual unit. Also, the metal layer ML of the second connection part L2-C and the metal layer ML of the second line part L2-L may be integrally formed as a single unitary and individual unit.

Referring to FIGS. 8A and 8B, the connection part CT2 of the touch sensor E2, and the connection part L2-C of the signal line L2, include mesh holes MSH formed by partially removing portions of the connection part CT2 and the connection part L2-C. The mesh holes MSH shown in FIG. 8A have a circular shape when viewed in a plan view, but they should not be limited thereto or thereby. As shown in FIG. 8C, the mesh holes MSH may have a square shape. In addition, the mesh holes MSH may have a quadrangular shape, e.g., a parallelogram shape, a lozenge shape, etc., or a polygonal shape.

Each of the connection part CT2 of the touch sensor E2 and the connection part L2-C of the signal line L2 has the mesh shape on the front surface of the base member 400-BS. A section of the mesh line MSL corresponding to unremoved portions of the connection part CT2 of the touch sensor E2 and the connection part L2-C of the signal line L2 (e.g., remaining portions of the mesh line MSL), has a width WT of about 5 micrometers to about 10 micrometers. The width WT of the mesh line MSL may be smaller or greater than the width of about 5 micrometers to about 10 micrometers, as long as the mesh line MSL is not easily perceived by the user.

The connection part L2-C of the signal line L2 including the metal layer ML is not perceived by the user, even though the connection part L2-C of the signal line L2 including the metal layer ML is located in the display area AR. This is because the connection part L2-C having the mesh shape has a low light reflectance. Accordingly, an area and a width of the non-display area BR may be reduced.

FIG. 8C shows the flow of static electricity applied to a conventional signal line. In this case, because a width of the signal line is extremely reduced at a boundary between a connection part of the signal line and a line part of the signal line, a resistance is extremely varied. As a result, static electric open (e.g., a voltage difference) occurs at the boundary in which the resistance is extremely varied.

FIG. 8D shows the flow of the static electricity applied to the signal line L2 according to the present exemplary embodiment. In this case, because the connection part L2-C of the signal line L2 has the mesh shape, the signal line L2 may have a substantially constant resistance, regardless of areas thereof. Although the mesh line MSL is partially opened, the static electric open may be prevented from occurring at the boundary in which the resistance is extremely varied. In other words, although the static electricity is applied to the touch panel, the boundary between the connection part L2-C of the signal line L2 and the line part L2-L of the signal line L2 is not opened.

In addition, the resistance between the touch sensor E2 and the signal line L2 is effectively gradually reduced. Although the static electricity is applied to the touch panel 400, the boundary between the sensor part PC2 of the touch sensor E2 and the connection part CT2 of the touch sensor E2 is not opened. In addition, although the static electricity is applied to the touch panel 400, the boundary between the connection part CT of the touch sensor E2 and the connection part L2-C of the signal line L2 is not opened.

FIGS. 9A, 9B, 10A, 10B, 11A, 11B, 12A, 12B, 13A, 13B, 14A, and 14B are views showing a manufacturing method of the touch panel 400 shown in FIG. 5. Each of FIGS. 9 to 14 shows a plan view (B) and a cross-sectional view (A) of a portion of the touch panel 400 shown in FIG. 5. Hereinafter, the manufacturing method of the touch panel 400 will be described in detail with reference to FIGS. 9A, 9B, 10A, 10B, 11A, 11B, 12A, 12B, 13A, 13B, 14A, and 14B. In FIGS. 9A, 9B, 10A, 10B, 11A, 11B, 12A, 12B, 13A, 13B, 14A, and 14B, the same reference numerals denote the same elements in FIGS. 5, 6A, and 6B, and thus detailed descriptions of the same elements will be omitted.

Referring to FIGS. 9A and 9B, the transparent conductive layer TCL and the metal layer ML are sequentially stacked on a base layer BBL. The base layer BBL may be a glass substrate, a sapphire substrate, a plastic film, or a portion of the display panel 300. The transparent conductive layer TCL may be formed by a deposition method, and the metal layer ML may be formed by a deposition or plating method.

Referring to FIGS. 10A and 10B, the transparent conductive layer TCL and the metal layer ML are patterned using a first mask M1. The first mask M1 includes an opening M1-OP (e.g., a plurality of openings) formed therethrough to correspond to a desired pattern. Other masks described below include openings, respectively. To pattern the transparent conductive layer TCL and the metal layer ML, a laser patterning manner or a photolithography patterning manner is used.

Referring to FIGS. 11A and 11B, the metal layer ML is patterned again using a second mask M2. Portions of the metal layer ML, which correspond to the touch sensors E1 and E2, are removed. Accordingly, the first sensor patterns P1 and the first connection patterns C1 of the first sensor part PC1 are formed, and the second sensor patterns P2 of the second sensor part PC2 are formed. In addition, the first line part L1-L and the first pad part L1-P of the first signal line L1, and the second line part L2-L and the second pad part L2-P of the second signal line L2, are formed.

Referring to FIGS. 12A and 12B, the mesh holes MSH are formed through the transparent conductive layer TCL and through the metal layer ML using a third mask M3. Therefore, the first connection part CT1 of the first touch sensor E1, the second connection part CT2 of the second touch sensor E2, the first connection part L1-C of the first signal line L1, and the second connection part L2-C of the second signal line L2 are completed.

Referring to FIGS. 13A and 13B, the insulating patterns IP are formed by spotting an insulating material, or by forming an insulating layer and patterning the insulating layer. When a mask is used, the insulating patterns may be deposited on specific areas.

Referring to FIGS. 14A and 14B, the second connection patterns C2 are formed on the insulating patterns IP. The second connection patterns C2 are formed by bridge patterns using a mask, or by forming a metal layer and patterning the metal layer.

Figure 15:
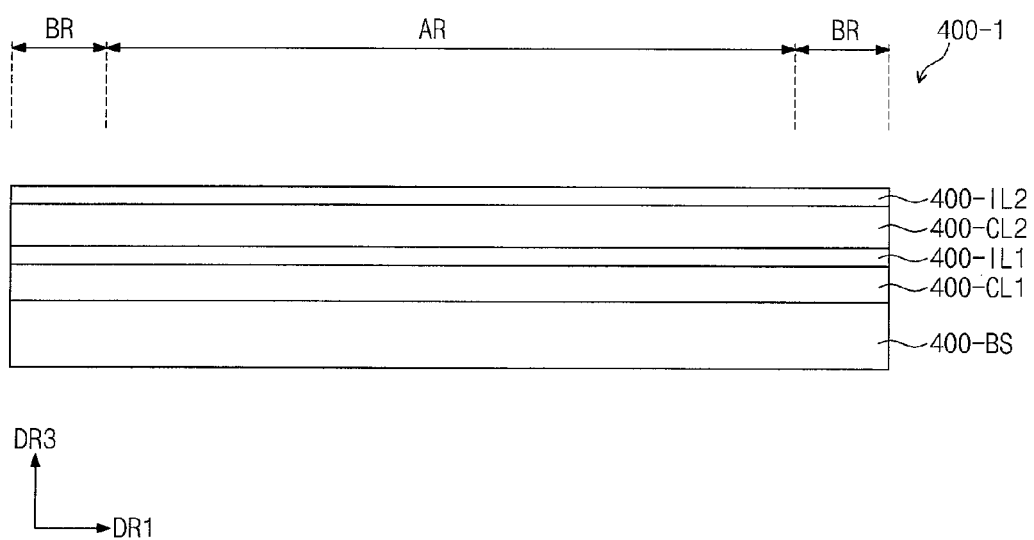
FIG. 15 is an enlarged cross-sectional view showing a touch panel according to an exemplary embodiment of the present disclosure.
Figure 16:
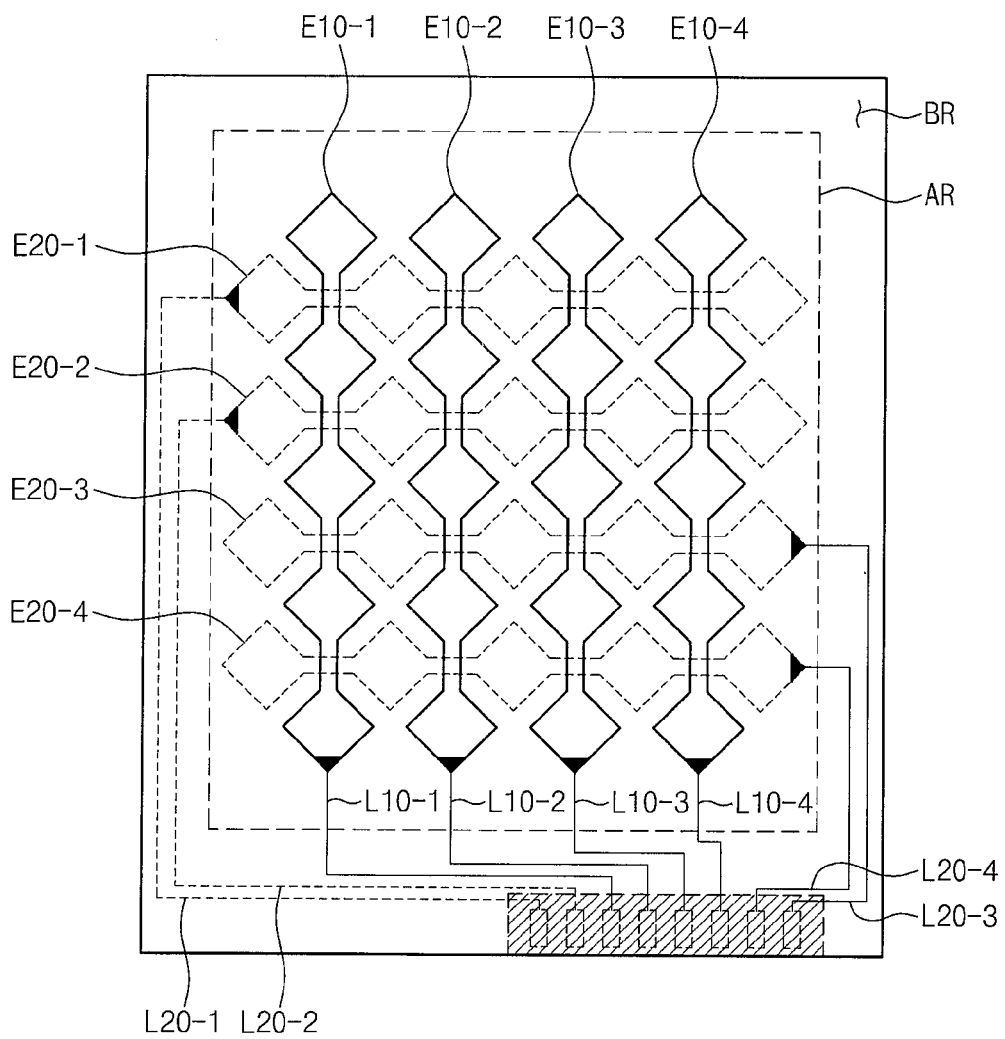
FIG. 16 is a plan view showing a touch panel according to an exemplary embodiment of the present disclosure.

FIG. 15 is an enlarged cross-sectional view showing a touch panel 400-1 according to an exemplary embodiment of the present disclosure, and FIG. 16 is a plan view showing the touch panel 400-1 according to an exemplary embodiment of the present disclosure. In FIGS. 15 and 16, different features of the touch panel 400-1 from those of the touch panel 400 described with reference to FIGS. 4 to 14 will be mainly described.

Referring to FIGS. 15 and 16, the touch panel 400-1 includes a base member 400-BS, a first conductive layer 400-CL1, a first insulating layer 400-1L1, a second conductive layer 400-CL2, and a second insulating layer 400-IL2. In the present exemplary embodiment, two-layer electrostatic capacitive type touch panel will be described.

Each of the first and second conductive layers 400-CL1 and 400-CL2 includes at least one transparent conductive layer and at least one metal layer, which are stacked along the third direction DR3. The first conductive layer 400-CL1 includes first touch sensors E10-1 to E10-4 (hereinafter, assigned with a reference numeral E10) corresponding to the first touch sensors E1-1 to E1-4 described with reference to FIG. 5, and also includes first signal lines L10-1 to L10-4 (hereinafter, assigned with a reference numeral L10) corresponding to the first signal lines L1-1 to L1-4 described with reference to FIG. 5. The second conductive layer 400-CL2 includes second touch sensors E20-1 to E20-4 (hereinafter, assigned with a reference numeral E20) corresponding to the second touch sensors E2-1 to E2-4 described with reference to FIG. 5, and also includes second signal lines L20-1 to L20-4 (hereinafter, assigned with a reference numeral L20) corresponding to the second signal lines L2-1 to L2-4 described with reference to FIG. 5.

In this case, each of the second touch sensors E20 may include the first sensor pattern P1 and the first connection pattern C1, which are integrally formed as a single unitary and individual unit. That is, the insulating patterns IP may be omitted. The first insulating layer 400-IL1 insulates the first conductive layer 400-CL1 from the second conductive layer 400-CL2. The first insulating layer 400-IL1 protects the second conductive layer 400-CL2.

Figure 17:
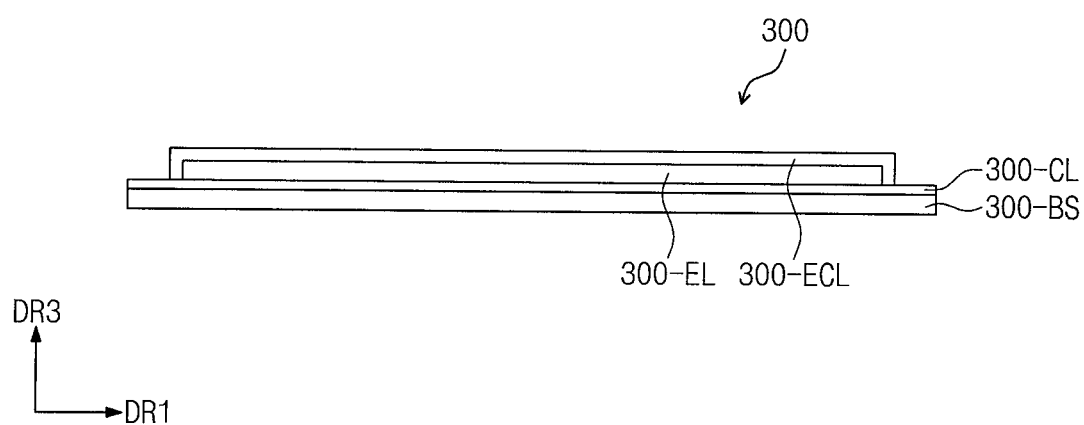
FIG. 17 is an enlarged cross-sectional view showing a display panel according to an exemplary embodiment of the present disclosure.
Figure 18:
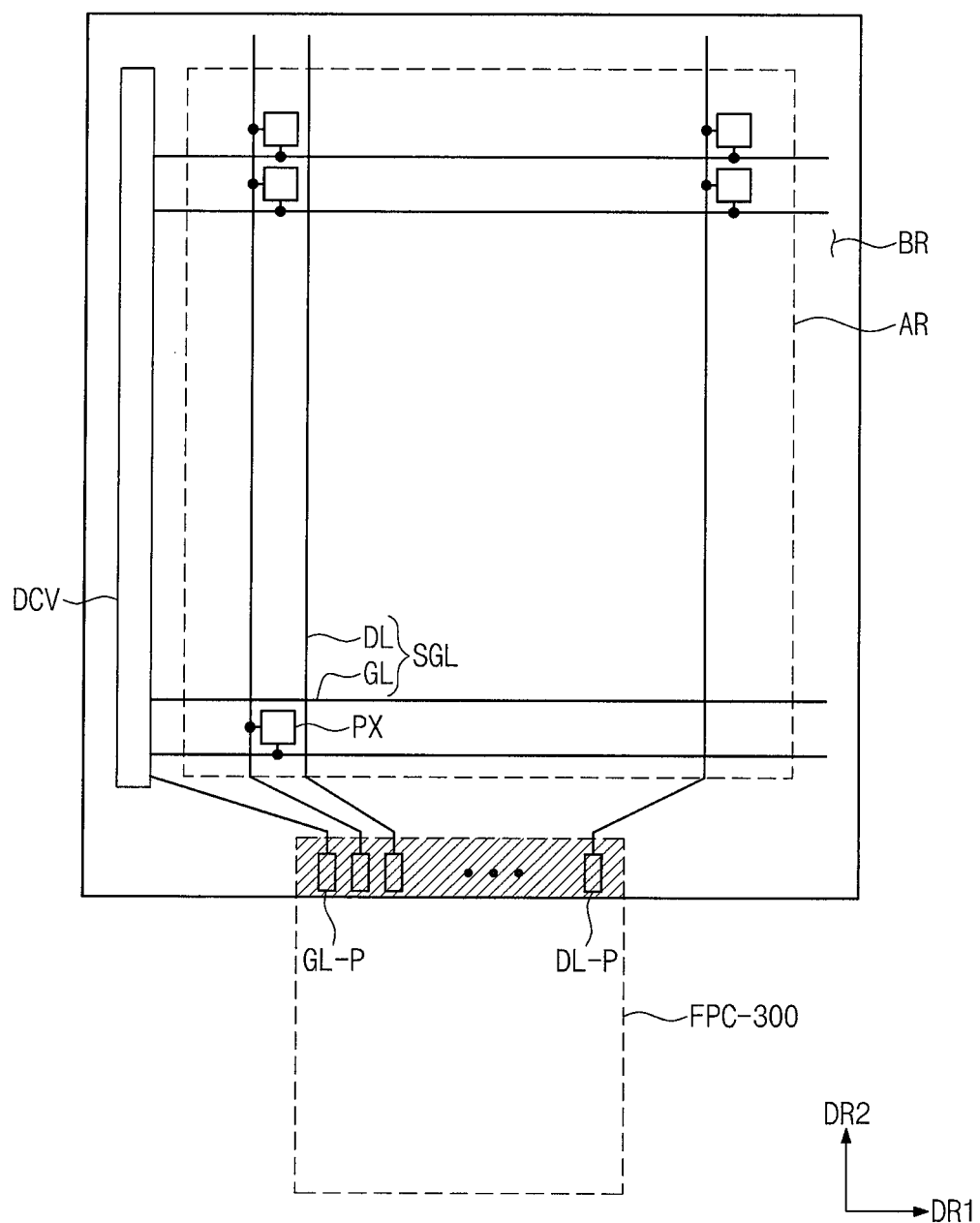
FIG. 18 is an enlarged cross-sectional view showing a display panel according to an exemplary embodiment of the present disclosure.
Figure 19:
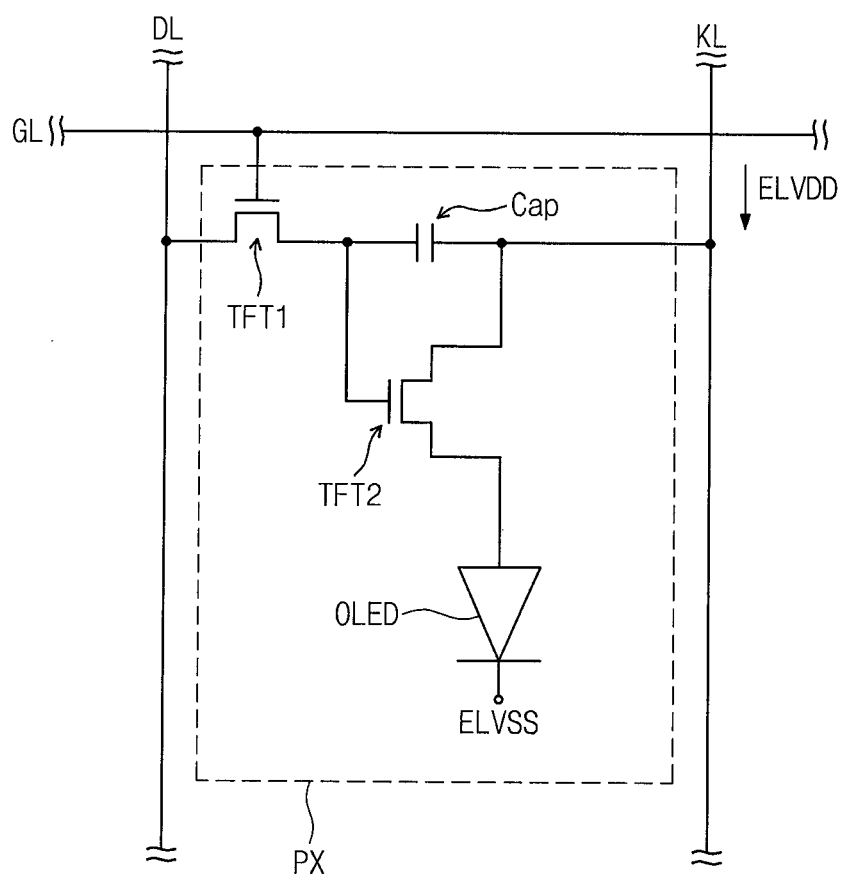
FIG. 19 is an equivalent circuit diagram showing a pixel according to an exemplary embodiment of the present disclosure.

FIG. 17 is an enlarged cross-sectional view showing a display panel 300 according to an exemplary embodiment of the present disclosure, FIG. 18 is an enlarged cross-sectional view showing the display panel 300 according to an exemplary embodiment of the present disclosure, and FIG. 19 is an equivalent circuit diagram showing a pixel PX according to an exemplary embodiment of the present disclosure.

Referring to FIG. 17, the display panel 300 includes a base member 300-BS, a circuit layer 300-CL, a device layer 300-EL, and an encapsulation layer 300-ECL. Although not shown in figures, the display panel 300 may further include an optical member located on the encapsulation layer 300-ECL, e.g., a retardation plate, a polarization layer, etc.

The base member 300-BS includes at least one plastic film. The base member 300-BS includes two plastic films, and inorganic layers, silicon nitride layer, and/or silicon oxide layer, which are located between the plastic films. The base member 300-BS includes at least one of polyimide (PI), polyethyleneterephthalate (PET), polyethylenenaphthalate (PEN), polyethersulphone (PES), and fiber reinforced plastics (FRP).

The circuit layer 300-CL includes a plurality of signal lines SGL and electronic devices, which are located on the display panel 300. In addition, the circuit layer 300-CL includes a plurality of insulating layers to insulate the signal lines SGL from the electronic devices.

Referring to FIGS. 18 and 19, the circuit layer 300-CL includes the signal lines SGL. The signal lines SGL include gate lines GL arranged in the second direction DR2, and also include data lines DL arranged in the first direction DR1. Each of the gate lines GL is connected to a corresponding pixel of the pixels PX, and each of the data lines DL is connected to a corresponding pixel of the pixels PX. The circuit layer 300-CL includes circuits of the pixel PX, e.g., two or more thin film transistors TFT1 and TFT2 and at least one capacitor Cap. The circuit layer 300-CL may further include a gate driving circuit DCV located at one side of the non-display area BR.

The gate lines GL include gate pad parts GL-P located in the non-display area BR, and the data lines DL include data pad parts DL-P located in the non-display area BR. The gate pad parts GL-P and the data pad parts DL-P are connected to a second flexible circuit board FPC-300. The display panel 300 is connected to a main driving circuit through the second flexible circuit board FPC-300.

The device layer 300-EL includes display devices. As shown in FIGS. 18 and 19, the device layer 300-EL includes an organic light emitting diode OLED as a display device of the pixel PX. The device layer 300-EL may further include electronic devices supporting the organic light emitting diode OLED.

The encapsulation layer 300-ECL seals the device layer 300-EL. The device layer 300-EL includes a plurality of inorganic thin film layers and a plurality of organic thin film layers. In the present exemplary embodiment, the encapsulation layer 300-ECL may be replaced with an encapsulation substrate. The encapsulation substrate is located to be spaced apart from the base member 300-BS such that the device layer 300-EL is located between the encapsulation layer 300-ECL and the base member 300-BS. A sealant is provided along an edge of the encapsulation layer 300-ECL and/or the base member 300-BS to form a space.

The base member 400-BS (refer to FIG. 4) of the touch panel 400 is located on the encapsulation layer 300-ECL or on the encapsulation substrate. In the present exemplary embodiment, the conductive layer 400-CL of the touch panel 400 may be located directly on the encapsulation layer 300-ECL or directly on the encapsulation substrate.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed by the claims and their equivalents.

What is claimed is:

1. A display apparatus comprising:
    a display panel configured to display an image;
    a window member on the display panel and comprising a display area for transmitting the image, and a non-display area adjacent the display area; and
    a touch panel between the display panel and the window member, the touch panel comprising:
        a touch sensor corresponding to the display area and comprising a sensor part and a connection part; and
        a signal line comprising a connection part coupled to and overlapping the connection part of the touch sensor, and a line part coupled to the connection part of the signal line,
    wherein a plurality of first mesh holes are defined in the connection part of the touch sensor, and
    wherein a plurality of second mesh holes are defined in the connection part of the signal line.

2. The display apparatus of claim 1, wherein the connection part of the touch sensor comprises a transparent conductive layer, and wherein the connection part of the signal line comprises a metal layer.

3. The display apparatus of claim 2, wherein the line part of the signal line comprises:
    a transparent conductive layer integrally formed with the transparent conductive layer of the connection part of the touch sensor; and
    a metal layer integrally formed with the metal layer of the connection part of the signal line.

4. The display apparatus of claim 3, wherein the metal layer of the connection part of the signal line is on the transparent conductive layer of the connection part of the touch sensor.

5. The display apparatus of claim 4, wherein the connection part of the signal line has substantially a same shape as the connection part of the touch sensor in the display area.

6. The display apparatus of claim 1, wherein the line part of the signal line corresponds to the non-display area.

7. The display apparatus of claim 6, wherein the window member comprises:
    a base member; and
    a black matrix at a surface of the base member and overlapping the non-display area.

8. The display apparatus of claim 1, wherein the display panel comprises:
    a base member;
    a circuit layer on the base member;
    an organic light emitting device layer on the circuit layer; and
    an encapsulation layer for sealing the organic light emitting device layer.

9. The display apparatus of claim 8, wherein the touch sensor and the signal line are directly on the encapsulation layer.

10. The display apparatus of claim 9, wherein the encapsulation layer comprises inorganic thin film layers and organic thin film layers.

11. The display apparatus of claim 8, wherein the touch panel further comprises a touch panel base member on the encapsulation layer, and wherein the touch sensor and the signal line are on the touch panel base member.

12. The display apparatus of claim 1, wherein the touch sensor comprises:
    first touch sensors on a base layer; and
    second touch sensors on the base layer and insulated from the first touch sensors while crossing the first touch sensors.

13. The display apparatus of claim 12, wherein each of the first touch sensors comprises:
    a first sensor part, which comprises first sensor patterns arranged in a first direction, and first connection patterns respectively connecting adjacent ones of the first sensor patterns; and
    a first connection part, and
    wherein each of the second touch sensors comprises:
    a second sensor part, which comprises second sensor patterns arranged in a second direction crossing the first direction, and second connection patterns respectively connecting adjacent ones of the second sensor patterns; and
    a second connection part.

14. The display apparatus of claim 13, wherein the touch sensor further comprises insulating patterns on the first connection patterns and spaced apart from each other, and
    wherein the second connection patterns are on the insulating patterns.

15. The display apparatus of claim 13, wherein the first sensor patterns and the first connection patterns are integrally formed,
    wherein the second sensor patterns and the second connection patterns are integrally formed, and
    wherein the first touch sensors are on a different layer than the second touch sensors.

16. The display apparatus of claim 1, wherein the plurality of first mesh holes are continuous to the plurality of second mesh holes.

17. The display apparatus of claim 1, wherein each of the connection part of the touch sensor and the connection part of the signal line includes mesh lines, and
    wherein the mesh lines have a width of about 5 micrometers to about 10 micrometers.

18. A touch panel comprising:
    a touch sensor comprising a transparent conductive layer; and
    a signal line coupled to the touch sensor and comprising a connection part, and a line part,
    wherein the connection part comprises:
        a transparent conductive layer integrally formed with the transparent conductive layer of the touch sensor; and
        a metal layer overlapping the transparent conductive layer of the connection part,
    wherein a plurality of first mesh holes are defined in the transparent conductive layer of the connection part, and
    wherein a plurality of second mesh holes are defined in the metal layer of the connection part.

19. The touch panel of claim 18, wherein the line part comprises:
    a transparent conductive layer integrally formed with the transparent conductive layer of the connection part; and
    a metal layer integrally formed with the metal layer of the connection part.

20. The touch panel of claim 19, wherein the metal layer of the connection part is on the transparent conductive layer of the connection part.

21. The touch panel of claim 19, wherein the metal layer of the connection part comprises molybdenum, silver, titanium, copper, aluminum, or an alloy thereof.

22. The touch panel of claim 21, wherein the transparent conductive layer of the connection part comprises indium tin oxide, indium zinc oxide, zinc oxide, indium tin zinc oxide, PEDOT, metal nanowire, or graphene.

* * * * *